(12) United States Patent
Fujibayashi

(10) Patent No.: US 7,185,156 B2
(45) Date of Patent: Feb. 27, 2007

(54) STORAGE SYSTEM WITH AUTOMATED RESOURCE ALLOCATION

(76) Inventor: Akira Fujibayashi, c/o Hitachi, Ltd., Intellectual Property Group, New Marunouchi Bldg. 5-1, Marunouchi 1-chome, Chiyoda-ku, Tokyo 100-8220 (JP)

( * ) Notice: Subject to any disclaimer, the term of this patent is extended or adjusted under 35 U.S.C. 154(b) by 113 days.

(21) Appl. No.: 10/847,869

(22) Filed: May 19, 2004

(65) Prior Publication Data

US 2005/0216663 A1  Sep. 29, 2005

(30) Foreign Application Priority Data

Mar. 25, 2004  (JP)  ............................. 2004-088296

(51) Int. Cl.
*G06F 12/00* (2006.01)
(52) U.S. Cl. ........................................ 711/161; 710/15
(58) Field of Classification Search ................. 711/161
See application file for complete search history.

(56) References Cited

U.S. PATENT DOCUMENTS

| | | | |
|---|---|---|---|
| 5,603,003 A | 2/1997 | Akizawa et al. | |
| 5,619,728 A | 4/1997 | Jones et al. | |
| 6,256,749 B1 | 7/2001 | Kakuta et al. | |
| 6,442,706 B1* | 8/2002 | Wahl et al. | 714/6 |
| 6,477,619 B1 | 11/2002 | Fujimoto et al. | |
| 6,578,100 B1 | 6/2003 | Ninomiya et al. | |
| 6,658,526 B2 | 12/2003 | Nguyen et al. | |
| 6,711,649 B1 | 3/2004 | Bachmat et al. | |
| 2002/0169901 A1 | 11/2002 | Fujibayashi et al. | |
| 2002/0188626 A1 | 12/2002 | Tomita et al. | |
| 2003/0065733 A1* | 4/2003 | Pecone | 709/211 |
| 2003/0085914 A1 | 5/2003 | Takaoka et al. | |
| 2003/0154281 A1 | 8/2003 | Mitsuoka et al. | |
| 2003/0182516 A1 | 9/2003 | Fujimoto | |
| 2003/0204672 A1 | 10/2003 | Bergsten | |
| 2004/0043755 A1 | 3/2004 | Shimooka et al. | |
| 2004/0059958 A1 | 3/2004 | Umberger et al. | |
| 2004/0098538 A1 | 5/2004 | Horn et al. | |
| 2004/0102925 A1* | 5/2004 | Giffords | 702/182 |
| 2004/0139168 A1 | 7/2004 | Tanaka et al. | |
| 2004/0143832 A1 | 7/2004 | Yamamoto et al. | |
| 2005/0027900 A1 | 2/2005 | Pettey | |

FOREIGN PATENT DOCUMENTS

JP  2004/178169  6/2004

* cited by examiner

*Primary Examiner*—Brian R. Peugh
*Assistant Examiner*—Jared Rutz
(74) *Attorney, Agent, or Firm*—Mattingly, Stanger, Malur & Brundidge, P.C.

(57) ABSTRACT

In the case in which plural disk control apparatuses functions as one disk control apparatus with a mutual connecting network, a processor is used as an independent resource. Moreover, states of use of resources are monitored, and processing from distribution of the resources to allocation of control tasks is optimized promptly so as to be compatible with a user request. By promptly making system performance compatible with the user request according to the present invention, a state in which the user request and the system performance are alienated from each other for a long time is eliminated.

52 Claims, 14 Drawing Sheets

FIG. 7A

| GRP ID | VOL ID | READ | | WRITE | |
|---|---|---|---|---|---|
| 501 | 502 | FE PROCESS MPID 503 | BE PROCESS MPID 504 | FE PROCESS MPID 505 | BE PROCESS MPID 506 |
| 0 | 2 | 0 | 1 | 0 | 2 |
| 1 | 3 | 3 | 3 | 3 | 4 |
| 1 | 5 | 4 | 5 | 5 | 6 |

| MP ID | GROSS UTILIZATION RATIO (%) | SHARING STATE BY TASK | | | | FUNCTION | | |
|---|---|---|---|---|---|---|---|---|
| | | READ | | WRITE | | | | |
| | | FE PROCESS | BE PROCESS | FE PROCESS | BE PROCESS | REMOTE COPY PROCESSING | LOCAL COPY PROCESSING | RAID PROCESSING |
| 507 | 508 | 509 | 510 | 511 | 512 | 513 | 514 | 515 |
| 0 | 80 | 80 | 0 | 10 | 0 | 0 | 0 | 10 |
| 1 | 50 | 0 | 40 | 0 | 0 | 60 | 0 | 0 |
| 2 | 50 | 0 | 0 | 0 | 80 | 0 | 5 | 20 |
| 3 | 80 | 30 | 30 | 30 | 0 | 0 | 0 | 5 |
| 4 | 60 | 40 | 0 | 0 | 40 | 10 | 0 | 10 |

| CHANNEL ID | UTILIZATION RATIO (%) |
|---|---|
| 0 | 60 |
| 1 | 40 |
| 2 | 70 |
|  |  |

FIG. 8B

| MUTUAL CONNECTING NETWORK PATH ID | UTILIZATION RATIO (%) |
|---|---|
| 0 | 80 |
| 1 | 30 |
| 2 | 60 |
|  |  |

FIG. 8C

| MEMORY PATH ID | UTILIZATION RATIO (%) |
|---|---|
| 0 | 80 |
| 1 | 30 |
| 2 | 60 |
| 3 | 40 |
|  |  |

FIG. 9

| MP ID | SURPLUS GROSS UTILIZATION RATIO (%) | ACTUAL UTILIZATION RATIO (%) | SURPLUS INFORMATION BY TASK (PROCESSING TIME RATIO OF PROCESSOR THAT IS ADDITIONALLY ALLOCATED TO THE TASK) | | | | | |
|---|---|---|---|---|---|---|---|---|
| | | | READ | | WRITE | | FUNCTION | |
| | | | FE PROCESS SURPLUS | BE PROCESS | FE PROCESS | BE PROCESS | REMOTE COPY PROCESSING | LOCAL COPY PROCESSING | RAID PROCESSING |
| 5 | 0 | 85 | 0 | 0 | 0 | 0 | 0 | 0 | 0 |
| 6 | 30 | 55 | 30 | 20 | 0 | 20 | 30 | 30 | 30 |
| 7 | 30 | 55 | 30 | 30 | 30 | 30 | 30 | 30 | 30 |
| 8 | 0 | 85 | 0 | 0 | 0 | 0 | 0 | 0 | 0 |
| 9 | 20 | 65 | 20 | 20 | 20 | 20 | 10 | 20 | 10 |

FIG. 10

| DEFINITION 1201 | OBJECT GRP ID 1202 | OBJECT VOL ID 1204 | FEBE DISTRIBUTED PROCESSING 1206 |
|---|---|---|---|
| 0 | 0 | — | YES |
| 1 | 1 | 3 | NO |
| 2 | — | 4 | YES |

| DEFINITION 1301 | UPPER LIMIT OF RD/WR PROCESSING TIME RATIO 1302 | UPPER LIMIT OF LOCAL COPY PROCESSING TIME RATIO 1303 | UPPER LIMIT OF RAID PROCESSING TIME RATIO 1304 | UPPER LIMIT OF REMOTE COPY PROCESSING TIME RATIO 1305 |
|---|---|---|---|---|
| 3 | | | | 50% |

| # | CLIENT ID 1501 | DISK ARRAY ID 1502 | SLOT ID 1503 | PACKAGED 1504 | PART ID 1505 | FIXED KEY 1506 | ISSUED KEY 1507 | STATE 1508 |
|---|---|---|---|---|---|---|---|---|
| 0 | 003 | 1000 | 1A | Y | P3-002 | N | 23y-ysb-bbk-da | OK |
|   |     |      | 1B | Y | P3-101 | N | 384-3da-dak-af | OK |
|   |     |      | 1C | Y | P4-002 | Y | 736-333-dse-33 | OK |
|   |     |      | 1D | Y | P5-001 | Y | 444-33w-sda-3d | OK |
|   |     |      | 1E | Y | P5-003 | Y | 232-da3-f4f-d4 | OK |
|   |     |      | 1F | Y | P4-005 | Y | 34f-des-2s4-3e | NG |
|   |     |      | 1G | Y | P3-003 |   |                |    |
|   |     |      | 1H | Y | P2-002 |   |                |    |
| 1 | 003 | 2333 | 1A | Y | P3-005 | Y | 34f-des-2s4-23 | OK |
|   |     |      | 1B | Y | P3-009 | Y | 12f-348-w0j-j7 | OK |
|   |     |      | 1C | Y | P4-010 | Y | 34b-jsy-enk-76 | OK |
|   |     |      | 1D | Y | P5-200 | Y | 789-sdn-sd3-09 | NG |
|   |     |      | 1E | N |        |   |                |    |
|   |     |      | 1F | N |        |   |                |    |
|   |     |      | 1G | N |        |   |                |    |
|   |     |      | 1H | N |        |   |                |    |

| DISK ARRAY ID 1511 | SLOT ID 1512 | PART ID 1513 | KEY ISSUE TIME 1514 | KEY INVALIDATION TIME 1515 | KEY VALID GROSS INTEGRATED TIME 1516 | KEY VALID INTEGRATED TIME OF THIS MONTH 1517 |
|---|---|---|---|---|---|---|
| 1000 | 1A | P3-002 | 01/02/26 12:23:50 | | 13800:32:30 | 719:40:00 |
| | 1B | P3-101 | 02/11/30 08:30:30 | | 8000:30:30 | 719:40:00 |
| | ...... | ...... | ...... | ...... | ...... | ...... |
| | 1H | P2-002 | 01/02/12 07:56:43 | 01/02/20 10:30:50 | 2400:59:39 | 00:00:00 |

1510

STORAGE SYSTEM WITH AUTOMATED RESOURCE ALLOCATION

CROSS-REFERENCES TO RELATED APPLICATIONS

This application relates to and claims priority from Japanese Patent Application No. 2004-088296, filed on Mar. 25, 2004, the entire disclosure of which is incorporated herein by reference.

BACKGROUND OF THE INVENTION

1. Field of the Invention

The present invention relates to a storage, and in particular to disk array apparatus, which stores data in one or more disk devices, and a storage system including plural disk array apparatuses.

2. Description of the Related Art

Sizes of storages used in companies and the like are increasing year after year. In order to cope with this increase in sizes, a technique called a disk array, which connects plural storages and operates the storages as one storage system, has been devised.

FIG. 2 is a diagram showing an example of a structure of a conventional disk array apparatus (U.S. Pat. No. 6,477,619). As shown in FIG. 2, the disk array apparatus includes plural storages (here, disk devices) 202 and a disk control apparatus 210 that controls the plural storages 202. The disk control apparatus 210 includes: channel interface (hereinafter referred to as "channel IF") units 204 for performing data transfer between a computer, which uses the disk array apparatus, and the disk control apparatus 210; disk interface (hereinafter referred to as "disk IF") units 205 that execute data transfer between the disk devices 202 and the disk control apparatus 210; and memory units 208 that are cache memories storing data read and written between channel IFs and disk IFs or shared memories storing control information on a disk array (e.g., control information on data transfer between the channel IF units 204 and cache memories). Further, the channel IF units 204, the disk IF units 205, and the memory units 208 are connected to one another by a mutual connecting network 207.

SUMMARY OF THE INVENTION

A request of users with respect to scalability of performance of a disk array apparatus is strict. It is necessary to design the disk array apparatus such that one disk array apparatus can be extended to cover various disk array apparatuses ranging from a smaller disk array apparatus to a large disk array apparatus. In the case in which it is attempted to secure scalability in a disk array apparatus of a conventional technique, it is necessary to incorporate a mechanism for making it possible to add devices (e.g., interface for expansion: hereinafter referred to as "expansion feature") in a disk control apparatus of the disk array apparatus in advance. However, on the other hand, a request for a reduction in cost for the disk array apparatus is also strict. If the expansion feature is simply installed in the disk array apparatus, cost for installing the disk array apparatus becomes comparatively high for a user (especially for a user who does not require scalability). In addition, since a minimum unit in the case of expansion is a channel IF or the like, there is little degree of freedom of scalability.

On the other hand, as a technique for securing scalability, there is also a technique called a storage area network (hereinafter referred to as "SAN") in which individual disk array apparatuses are connected by a fiber channel or the like. However, in the case in which a large storage system is constituted by the SAN, cost for installing switch fabric, which realizes SAN connection, is required in addition to cost for the disk array apparatuses. In addition, in the case in which the disk array apparatuses are connected to one another by the SAN, since channel IF units, which should originally be connected to a computer, are used for the connection with the SAN, the number of interfaces, which can be used for data transfer between the computer and the storage system, is reduced.

Moreover, in order to secure performance desired by a user, an appropriate increase or reduction of apparatuses and evaluation thereof (if the performance can be secured) are required to be performed. However, this point is not taken into account in the conventional technique.

In order to solve the above-mentioned problems, the present invention adopts a structure described below as an embodiment. That is, the embodiment of the present invention is a storage system in which small disk array apparatuses are connected to one another by a mutual connecting network with a small disk array apparatus as one unit. In this case, it is assumed that the small disk array apparatus to be one unit has a structure described below. That is, the small disk array apparatus has a structure in which interface units, memory units, and microprocessor units are connected to one another by a mutual connecting network. Here, the respective disk array apparatuses are connected to one another via the mutual connecting networks that the disk array apparatuses have.

In addition, it is assumed that the storage system is connected to a management apparatus. Further, when a processor unit, a disk array apparatus of one unit, or the like is increased or reduced in the storage system, the management apparatus sequentially acquires information on performance of the entire storage system. The management apparatus compares the acquired performance and performance desired by a user, verifies increase and reduction of respective units, and instructs the user to perform change or the like of setting of the storage system (or automatically changes the setting).

More specifically, when processing is being executed in the storage system, the management apparatus monitors states of use (utilization ratios) of respective units (hereinafter also referred to as "resources") or a throughput in each I/F to find how the processing is shared by the processor unit and the like. Then, the management apparatus controls the storage system on the basis of the information so as to distribute the resources in accordance with a request of the user.

BRIEF DESCRIPTION OF THE DRAWINGS

In the accompanying drawings:

FIG. 7 is a diagram showing an example of a compilation table for states of use of resources;

FIG. 8 is a diagram showing an example of a compilation table for states of use of resources;

FIG. 9 is a diagram showing an example of a compilation table for states of use of resources;

FIG. 10 is a diagram showing an example of a management table for managing requirement definition of a user;

FIG. 11 is a diagram showing an example of a management table for managing requirement definition of a user;

FIG. 14 is a diagram showing an example of a management table for resource management and key management;

FIG. 15 is a diagram showing an example of a management table for resource management and key management;

DESCRIPTION OF THE PREFERRED EMBODIMENT

In the present invention, first, a disk array apparatus, in which a processor unit can be increased or reduced, is prepared as a disk array apparatus of one unit. Then, a storage system, which is constituted by connecting plural disk array apparatuses, is provided. In addition, in order to confirm if this storage system can show performance compatible with a request of a user, a management apparatus is added to the storage system. The management apparatus monitors various states of use of resources in the storage system. Moreover, the storage system includes a resource pool. This resource pool is a table for managing resources that are not used presently (on standby) in the storage system. The management apparatus controls the management of this resource pool and change of contents thereof to thereby promptly making performance of the storage system compatible with a user request. Embodiments of the present invention will be hereinafter described in detail.

Figure 1:
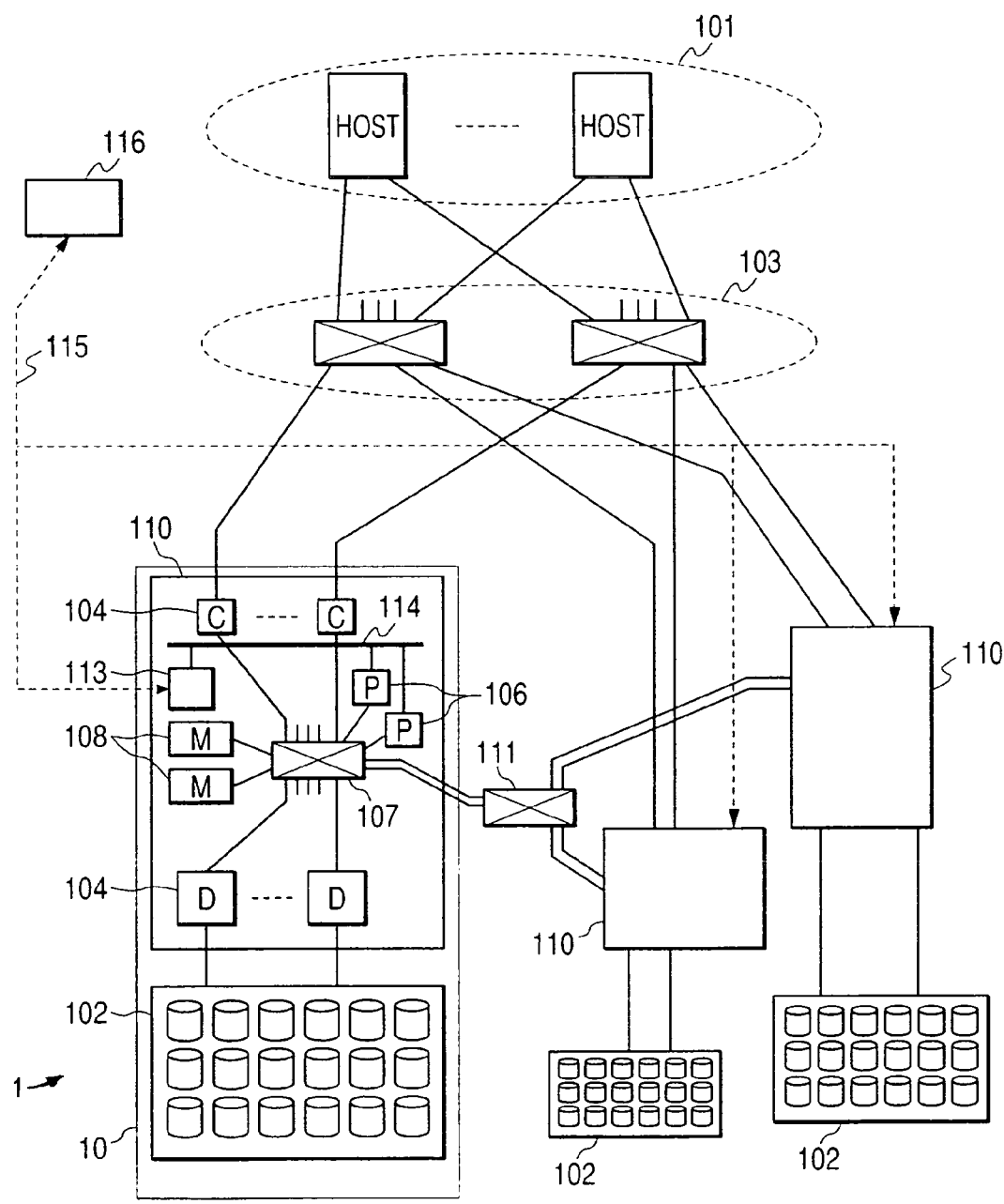
FIG. 1 is a diagram showing an example of a structure of a storage system.
Figure 2:
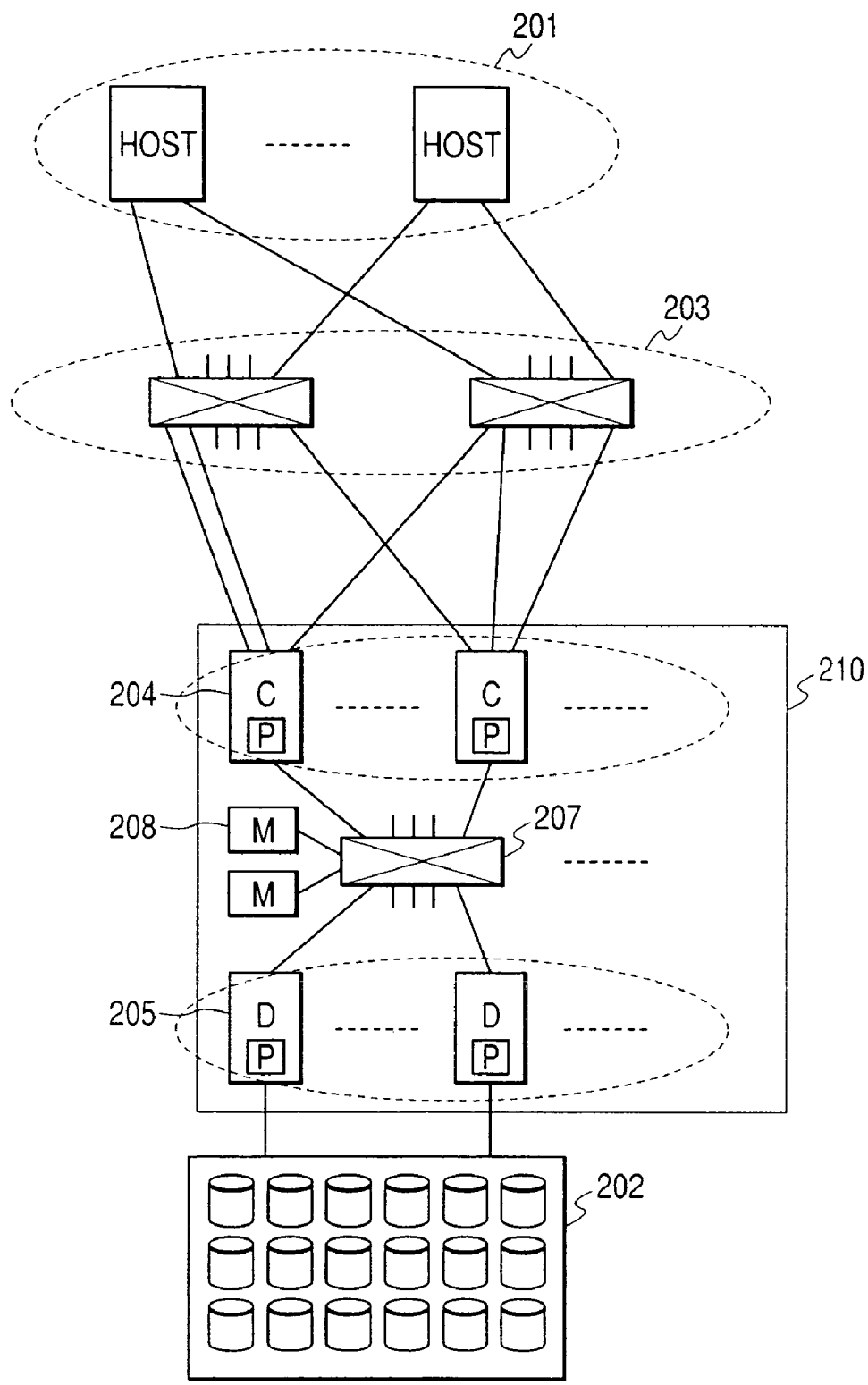
FIG. 2 is a diagram schematically showing a structure of a conventional disk array.

FIG. 1 is a diagram showing an example of a system structure of a first embodiment of a storage system.

A storage system 1 includes one or more disk array apparatuses 10 to be one unit and a mutual connecting network 111 that connects the disk array apparatuses 10 to one another. In addition, the respective disk array apparatuses 10 of the storage system 1 are connected to a management apparatus 116 via a network 115. The number of disk array apparatuses 10 included in the storage system 1 is arbitrary and is increased or reduced according to performance required by a user.

The disk array apparatus 10 includes a disk device group 102 and a disk control apparatus 110. The disk control apparatus 110 includes interface units 104, memory units 108, and processor units 106 that are connected to devices included in the disk device group 102 or a computer (hereinafter also referred to as "host computer") group 101. The interface units 104, the memory units 108, the processor units 106 are connected to one another via a mutual connecting network 107. In addition, the disk array apparatus 10 includes a management terminal unit 113. The management terminal unit 113 is connected to the management apparatus 116 via the network 115. In addition, the management terminal unit 113 is connected to the processor units 106 via a communication network 114. Here, the numbers of the processor units 106 and the like are arbitrary and are increased or reduced according to performance or the like required by the user.

Note that it is possible that the disk array apparatus 10 does not include the disk device group 102. In this case, the disk control apparatus 110 uses the disk device group 102 included in another disk array apparatus 10 via the mutual connecting networks 107 and 111.

Here, a size of the disk control apparatus 110 is set to about ¼ to ½ of the disk control apparatus included in the conventional disk array apparatus, whereby packaging is made compact, and cost is reduced.

The mutual connecting networks 111 and 107 may be devices such as switch fabric or hubs of a bus type or may be mesh connection (complete cross coupling) by a simple cable. A band for required minimum data transfer is prepared for the mutual connecting networks, whereby cost for the entire apparatus decreases. In addition, the processor units are adapted to be resources that can be increased and reduced, whereby flexibility of the structure increases.

The mutual connecting network 107 included in each disk array apparatus 10 is connected to the mutual connecting networks 107 included in the other disk array apparatuses 10 via the mutual connecting network 111.

One or more disk devices are included in the disk device group 102. Note that, here, a hard disk device is assumed as a storage medium. However, other storages media may be adopted (a semiconductor storage such as a flash memory, a storage medium such as a DVD, etc.). In addition, the host computer group 101 includes one or more computers. The host computer group 101 and the respective disk array apparatuses 10 are connected to each other by a network 103 such as a switch.

Figure 3:
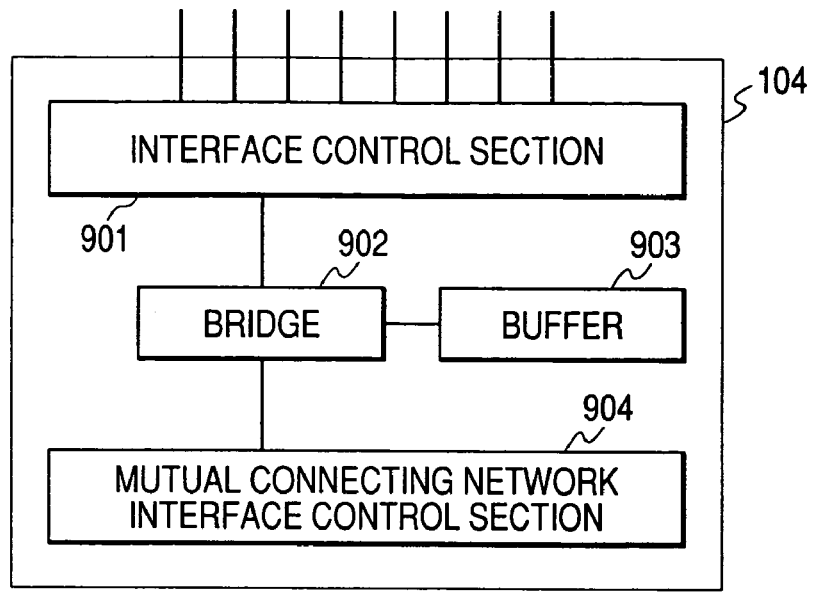
FIG. 3 is a diagram showing an example of a structure of an interface unit.

FIG. 3 is a diagram showing an example of a structure of the interface unit 104. The interface unit 104 includes: an interface control section 901 that is connected to the host computers or the disk devices; a mutual connecting network interface control section 904 that is connected to the mutual connecting network 107; a buffer 903; and a bridge 902 that connects the interface control section 901, the mutual connecting network interface control section 904, and the buffer 903 to one another.

The buffer 903 temporarily holds data that is transferred between the interface control section 901 and the mutual connecting network interface control section 904. The bridge 902 controls data transfer among the respective devices. The interface control section 901 performs transmission and reception of data or control information with the host computers or the disk devices. The mutual connecting network interface control section 904 performs transmission and reception of data or control information with the other devices included in the disk array apparatus 10, for example, the processor units 106 and the memory units 108.

In addition, the interface control section 901 and the mutual connecting network interface control section 904 acquire and hold performance information or the like for monitoring a state to be described later (an integrated use time, an amount of transferred data, etc. in a fixed time of the interface unit). The processor unit 106 reads out this information via the mutual connecting network interface 904.

Figure 4:
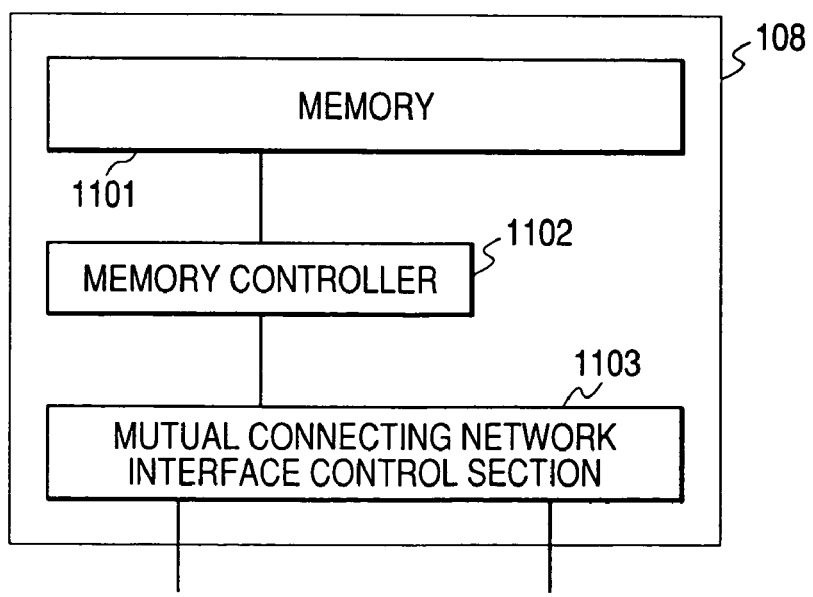
FIG. 4 is a diagram showing an example of a structure of a memory unit.

FIG. 4 is a diagram showing an example of a structure of the memory unit 108. The memory unit 108 includes: a mutual connecting network interface control section 1103 that is connected to the mutual connecting network 107; a memory controller 1102; and a memory 1101. The mutual connecting network interface control unit 1103 performs transmission and reception of data or control information with the other devices included in the disk array apparatus 10, for example, the processor units 106 and the interface units 104.

Data to be transmitted and received between the host computer group 101 and the disk device group 102 is stored in the memory 1101. The memory controller 1102 controls reading and writing of data with respect to the memory 1101. In addition, the mutual connecting network interface control unit 1103 collects and holds performance information and the like (an integrated use time, an amount of transferred data, etc. in a fixed time of the interface). The processor units 106 read out this information via the mutual connecting network 107.

Figure 5:
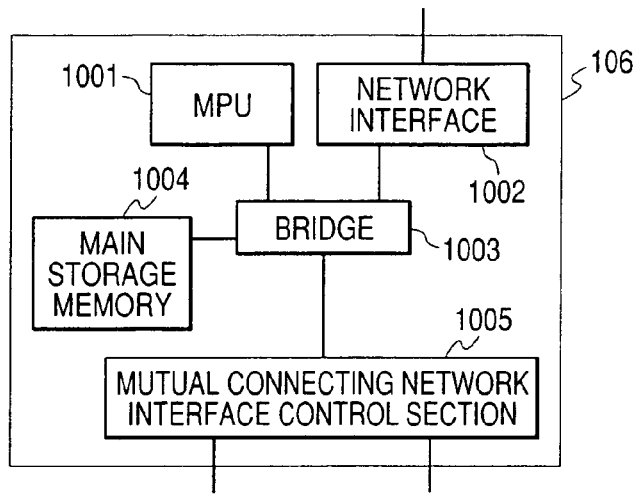
FIG. 5 is a diagram showing an example of a structure of a processor unit.

FIG. 5 is a diagram showing an example of a structure of the processor unit 106. The processor unit 106 includes: a mutual connecting network interface control section 1005 that is connected to the mutual connecting network 107; a microprocessor unit (MPU) 1001; a memory 1004 that is used by the MPU 1001 as a main memory; a network interface 1002 that is connected to the other processor units 106 and the management terminal unit 113 via the communication network 114; and a bridge 1003 that connects these devices to one another.

Figure 6:
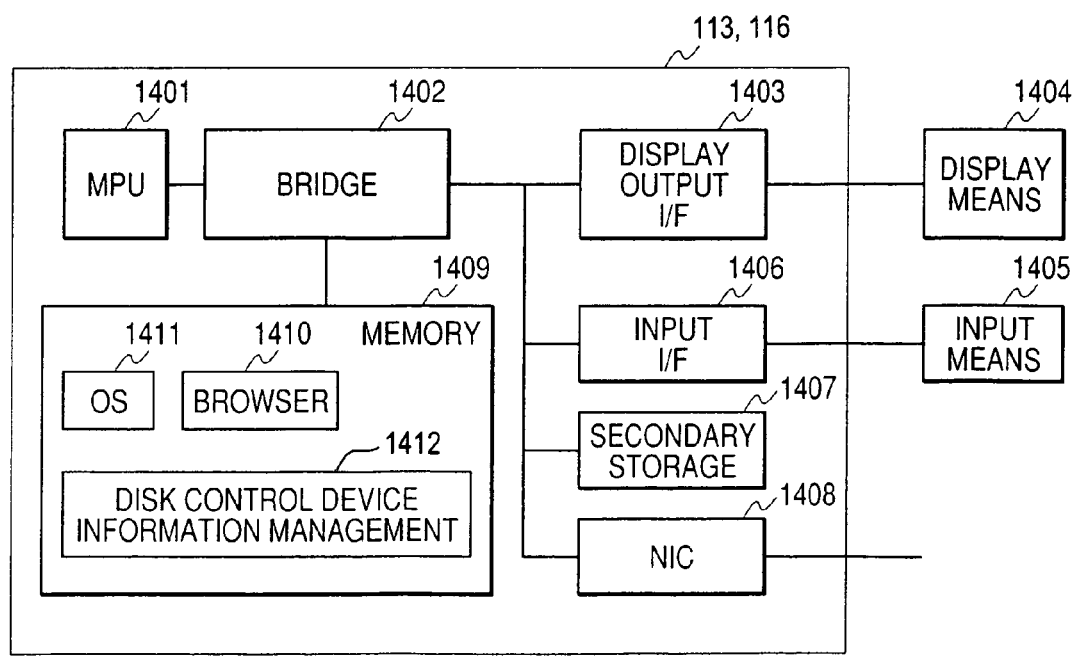
FIG. 6 is a diagram showing an example of a structure of a management terminal unit.

FIG. 6 is a diagram showing an example of a structure of the management terminal unit 113. The management terminal unit 113 may be a general computer. The management terminal 113 includes: an MPU 1401; a memory 1409; a network interface (NIC) 1408 that is connected to the communication network 114; a secondary storage section 1407; an input interface ("interface" will be hereinafter also referred to as "I/F") 1406; a display output I/F 1403; and a bridge 1402 that connects these devices to one another. Note that the management terminal unit 113 may include a display section 1404 such as a display and an input section 1405 such as a keyboard. In this case, the display output I/F 1403 is connected to the display unit 1404. In addition, the input I/F 1406 is connected to the input section 1405.

An operating system (OS) 1411, an application 1410 such as a browser, and a disk control apparatus information management program 1412, which are executed by the MPU 1401, are stored in the memory 1409. Note that the disk control apparatus information management program 1412 will be described later.

In addition, the management apparatus 116 basically has the same structure as the management terminal unit 113. However, the NIC 1408 is connected to the network 115.

A method for realizing rearrangement of the resources adapted to a request of a user in the storage system 1 will be hereinafter described.

An administrator (hereinafter also referred to as "operator") of the storage system 1 performs setting of the storage system 1 via a display unit and an input unit included in the management apparatus 116 or the management terminal unit 113 and receives a notice from the storage system 1. Here, more specifically, the display unit is a display of the management terminal unit 113 or a display of the management apparatus 116. The notice to the operator is direct display on a display included in the management terminal unit 113, mail transmission to the management apparatus 116 via a network, or browser display on the management apparatus 116 via a network.

In addition, as specific examples of the input section, there are a keyboard, input means of a browser base via a network. As an example, FIG. 1 illustrates a case in which the operator operates the management terminal unit 113 via the management apparatus 116 to perform configuration information management and control of the entire plural disk array apparatuses (i.e., the storage system 1).

Therefore, in this embodiment, the management apparatus 116 is a simple input/output terminal. Acquisition (monitoring) of configuration information, performance information, usage information (hereinafter also referred to as "configuration information and the like" or "performance information and the like") of the storage system 1, control of rearrangement of the resources, and the like are performed by the management terminal unit 113.

More specifically, the management terminal unit 113 receives an instruction from the operator, collects configuration information in the respective disk array apparatuses 10, and instructs the disk array apparatuses 10 to perform configuration change (rearrangement of the resources).

First, the processor units 106 of each disk array apparatus 10 collect performance information and the like such as a path utilization ratio, a memory utilization ratio, and a path transfer speed in the interface units 104, the mutual connecting network 107, or the memory units 108. More specifically, the processor units 106 read out information collected in the respective units via the mutual connecting network 107. Thereafter, the processor units 106 send the collected information to the management terminal unit 113 through the communication network 114.

In addition, the processor units 106 also collect information on an operating ratio of the processor units 106 themselves. More specifically, the processor units 106 collect information on a utilization ratio of a processor for each kind of processing (hereinafter also referred to as "task") of a certain unit such as input/output (hereinafter also referred to as "I/O") of data to and from the host computer group 101 and functions of the disk array apparatus 10. Note that the functions of the disk array apparatus 10 in this context include remote copy for securing redundancy of data by transferring the data from one storage system 1 to the other storage systems 1, mirroring (hereinafter also referred to as "local copy") for duplicating data in one storage system 1 (e.g., among the disk array apparatuses 10 or in the disk array apparatus 10), RAID control, and the like. Note that the RAID control is a technique for increasing redundancy of data by creating one storage area with plural disk devices and creating and storing redundant data such as parity.

In addition, the processor units 106 collect, for each virtual storage area (hereinafter referred to as "logical volume") that the storage system 1 provides to an outside apparatus, information on sharing in the processor units 106 of processing concerning I/O with respect to the logical volume. More specifically, the processing concerning I/O in the storage system 1 is roughly divided into a front-end process (data transfer processing between the interface units 104 and the memory units 108, both of which are connected to the host computer group 101; also referred to as "FE process") and a back-end process (data transfer processing between the memory units 108 and the interface units 104, which are connected to the disk device group 102; also referred to as "BE process"). Thus, the processor units 106 collect information about which end of I/O of which logical volume the processor units 106 themselves are performing processing for. The information on the processor units 106 themselves collected by the processor units 106 is also sent to the management terminal unit 113.

Note that the logical volume is associated with a physical storage area included in one or more disk devices.

The processor units 106 of each disk array apparatus 10 collect the configuration information and the like, for example, at a fixed interval and send the information to the management terminal unit 113. The management terminal unit 113 having received the information transfers the information to the management terminal unit 113 that controls the entire storage system 1 (hereinafter also referred to as "overall management terminal unit 113") via the mutual connecting network 111. The overall management terminal unit 113 is designated out of the management terminal units 113 included in the storage system by the operator or the like in advance via the management apparatus 116.

Note that the processing for information collection may be realized by a control program that is executed on microprocessors of the processor units 106 or the like or may be realized by hardware implemented in the interface units 104, the memory units 108, and the mutual connecting network 107.

In this way, the configuration information and the like in the storage system 1 for a fixed period are collected. The overall management terminal unit 113 creates tables as shown in FIGS. 7 to 9 and manages the collected information. As management objects, there are a use state of each resource, a sharing state of processing with respect to the logical volume, an execution state of I/O processing and processing of other functions, and the like.

FIG. 7A is a diagram showing an example of a table 50 that is used by the management terminal 113 in order to manage the processor units 106 responsible for each task that is executed according to a reading (hereinafter also referred to as "READ") or writing (hereinafter also referred to as "WRITE") request from the host computer group 101 with respect to a certain logical volume belonging to a certain group. Here, the group is a unit for managing a logical volume that is set arbitrarily in the storage system 1.

The table 50 includes records for the number of logical volumes. Each record includes: a field 501 in which a group identifier (hereinafter referred to as "ID"), which is allocated to a group to which a logical volume corresponding to the record belongs, is registered; a field 502 in which a volume ID, which is allocated to the logical volume corresponding to the record, is registered; a field 503 in which a processor ID, which is allocated to the processor unit 106 responsible for a front-end process, is registered in response to a READ request from the host computer group 101 with respect to the logical volume corresponding to the record; a field 504 in which a processor ID, which is allocated to the processor unit 106 responsible for a back-end process, is registered in response to the READ request from the host computer group 101 with respect to the logical volume corresponding to the record; a field 505 in which the processor ID of the processor unit 106 responsible for the front-end process is registered in response to a WRITE request from the host computer group 101 with respect to the logical volume corresponding to the record; and a field 506 in which the processor ID of the processor unit 106 responsible for the back-end process is registered in response to the Write request from the host computer group 101 with respect to the logical volume corresponding to the record.

FIG. 7B is a diagram showing an example of a table 51 that is used by the overall management terminal unit 113 in order to manage information on to which extent each processor unit 106 is used by what kinds of tasks. The table 51 includes records for the number of the processor units 106 included in the storage system 1. Each record includes: a field 507 in which a processor ID of the processor unit 106 corresponding to the record is registered; a field 508 in which information on a gross utilization ratio of the processor unit 106 corresponding to the record (indicating to which extent the processor unit 106 is used for a fixed time in average); and a field 516 in which information on a usage ratio of the processor unit 106 of each task, which is executed in the processor unit 106 corresponding to the record, is registered.

Moreover, the field 516 includes sub-fields for the number of kinds of tasks to be executed in the storage system 1. In this embodiment, the field 516 includes, for example: a sub-field 509 for the front-end process corresponding a READ request; a sub-field 510 for a back-end process corresponding to the READ request; a sub-field 511 for a front-end process corresponding to a WRITE request; a sub-field 512 for a back-end process corresponding to the WRITE request; a sub-field 513 for remote copy processing; a sub-field 514 for local copy processing; and a sub-field 515 for RAID processing. In each sub-field, information on a ratio of usage of the processor unit 106 by a task corresponding to the sub-field (here, a ratio of a time during which the processor unit 106 is occupied with respect to a use time of the entire processor) is registered. More specifically, in FIG. 7B, the processor unit 106 corresponding to a processor ID2 is used 50%, of which 80% is used for the back-end process of the WRITE request and 20% is used for the RAID processing. In other words, the processor unit 106 corresponding to the processor ID2 is used for the back-end process of the WRITE request for 40% of a certain fixed time and used for the RAID processing for 10% of the certain fixed time. The remaining 50% of the processor unit 106 is not used.

FIG. 8A is a diagram showing an example of a table 52 that is used the overall management terminal unit 113 in order to manage an average utilization ratio of the interface units 104 to be connected to the host computer group 101. The table 52 includes records for the number of the interface units 104 to be connected to the host computer group 101. Each record includes: a field 522 in which an identifier allocated to the interface unit 104 to be connected to a host computer (hereinafter referred to as "channel ID") is registered; and a field 517 in which information on a utilization ratio in a fixed time of the interface unit 104 corresponding to the record is registered.

FIG. 8B is a diagram showing an example of a table 53 that is used by the overall management terminal unit 113 in order to manage an average utilization ratio of a path connecting the mutual connecting network 107 and the respective units. The table 53 includes records for the number of paths. Each record includes: a field 518 in which information on an identifier allocated to a path corresponding to the record (hereinafter referred to as "mutual connecting network path ID") is registered; and a field 519 in which information on a utilization ratio in a fixed time of a path corresponding to the record is registered.

FIG. 8C is a diagram showing an example of a table 54 that is used by the management terminal unit 113 in order to manage a ratio of a time in which each memory path in the memory unit 108 is occupied (time in which memory access is performed) in a fixed time (more specifically, a ratio of an integrated value of a time in which the memory path is occupied in a fixed time while read access or write access is performed with respect to the memory 1101) as a utilization ratio of the memory path. Note that, here, the memory path means a logical communication line that connects the respective units and the memory unit 108.

FIG. 9 is a diagram showing an example of a table 55 that is used by the overall management terminal unit 113 in order to manage information (hereinafter also referred to as "surplus information") indicating to which extent each processor unit 106 can be used for what kinds of tasks in future (i.e., surplus of resources). The table 55 includes a corresponding record for each of the processor units 106 included in the storage system 1. Each record includes: a field 530 in which a processor ID of the processor unit 106 corresponding to the record is registered; a field 531 in which information on a gross surplus ratio of the processor unit 106 corresponding to the record (indicating to which extent the processor unit 106 can be used more in average in a fixed time) is registered; a field 532 in which information on a utilization ratio of the processor unit 106 corresponding to the record is registered; and a field 551 in which information on a surplus ratio of the processor unit 106 for each task, which is executed in the processor unit 106 corresponding to the record, is registered.

In addition, as in the table 51, a field 551 includes sub-fields 533 to 539 for registering information on a surplus ratio for each task. Here, for example, the processor unit 106 of an MPID 5 is not allowed to be further used (because a surplus ratio is 0). On the other hand, a further increase in a utilization ratio of 30% is allowed for the processor unit 106 of an MPID 6. Further, it is indicated that, with respect to the utilization ratio of 30% that can be increased, the entire 30% can be, further allocated to READ processing of FE. Note that, in this embodiment, the gross surplus ratio is found by defining an upper limit value (here, 85%) of a utilization ratio of the processor unit 106 in advance and subtracting an actual utilization ratio from the upper limit value.

Note that, when allocation of resources is changed according to a request of an operator or the like to be described later, the overall management terminal unit 113 corrects the contents of the respective tables shown in FIGS. 7 to 9 according to the change. In addition, the respective management terminal units 113 may manage the contents of the respective tables shown in FIGS. 7 to 9 individually. Further, in changing the allocation of resources, the respective management terminal units 113 may change setting of the respective disk array apparatus with reference to the contents of the respective tables in accordance with an instruction of the overall management terminal unit 113.

The overall management terminal unit 113 compares the performance information and the like, which are managed as shown in FIGS. 7 to 9, and a request for performance designated by a user. Thereafter, on the basis of a result of the comparison, the overall management terminal unit 113 executes predetermined processing (e.g., informs the management apparatus 116 of the result, or changes the setting of the storage system 1 to rearrange the resources). As an execution time of the comparison, various elements, which are performed periodically at a fixed time interval, such as a user designated opportunity and configuration change detection timing are possible. As an example, there is a method in which performing the comparison at configuration change detection timing and a fixed time interval is set in the storage system 1 as default, and the comparison for a user instruction is executed preferentially at a stage when the instruction is made. In addition, there is a method in which, when plural users define requests to the storage system 1, respectively, priorities of the requests are determined among the users in order to solve inconsistency among the definitions for all the requests.

Comparison of a request for performance designated by a user (hereinafter referred to as "user request") in the overall management terminal unit 113 and the performance information and the like in the storage system 1 as well as an example of processing based upon a result of the comparison will be herein after described. For example, it is assumed that requests for performance as described below are defined by the user (hereinafter referred to as "user request definitions").

(1) A response time is attached importance for a logical volume of group ID 1.

(2) Remote copy processing is performed preferentially, but a processor utilization ratio of the remote copy processing does not exceed 1.5 times a processor utilization ratio of I/O processing.

Here, the operator or the like inputs the conceptual user request definition as indicated by (1) above from the input unit of the management apparatus 116. The overall management terminal unit 113, which has received the conceptual user request definition as indicated by (1) above from the management apparatus 116, converts the received user request definition into more concrete performance request information on the basis of a conversion rule set in advance. FIG. 10 is a diagram showing a structure of a user request definition table 12 that is used by the overall management terminal unit 113 in order to manage individual pieces of the converted performance request information. The user request definition table 12 includes a corresponding record for each of the user request definitions inputted by the operator or the like. Therefore, if the operator inputs a user request definition anew, the overall management terminal unit 113 adds a new record to the user request definition table 12.

Each record includes: a field 1201 in which information on an identifier allocated to a user request definition corresponding to the record (hereinafter referred to as "definition ID") is registered; a field 1202 in which a group ID of a group to be an object of the user request definition corresponding to the record is registered; a field 1204 in which a volume ID of a logical volume to be an object of the user request definition corresponding to the record is registered; and a field 1206 in which information on whether or not a front-end process and a back-end process are distributed to the plural processor units 106 and processed is registered. Note that each record may include a field other than these fields in order to convert a user request definition of the operator or the like into concrete performance request information in detail.

Here, for example, the user request definition of (1) is converted into performance request information specified by a definition ID 1 and managed. More specifically, as the definition ID 1, the user request definition of (1) define that a task with respect to a logical volume of a group ID 1 and a volume ID3 is a request for processing a front-end process and a back-end process centrally in one processor.

Note that, although not related to the user request definition of (1), other than this user request definition, a user request definition 1301 for performance request information, which holds information on upper and lower limits of a ratio of use time of an MPU spared for READ and WRITE processing 1302, local copy processing 1303, RAID processing 1304, and remote copy processing 1305 in each field, is also possible as shown in table 13 in FIG. 11. In addition, the overall management terminal unit 113 saves the user request definition table 12 as definition information of criteria for judgment on whether a state of the storage system 1 satisfies a request of the operator or the like.

Here, comparison of a state of the storage system 1 and the user request definition of (1) by the overall management terminal unit 113 will be considered. It is assumed that the storage system 1 is in a state indicated by FIGS. 7A to 9 at this point. According to the information of FIG. 7A, it is seen that processing with respect to the volume ID 3 is shared by the two processor units 106. In this case, a response is delayed by a time required for association of the two processor units 106. On the other hand, contents of the user request definition indicated by (1) request a quicker response (more specifically, the contents request that the one processor unit 106 should perform processing with respect to a logical volume. Note that information to the effect that information "attach importance to a response time" is converted into contents "the one processor unit 106 performs processing with respect to a logical volume" is stored in the above-mentioned conversion rule). Therefore, the overall management terminal unit 113 judges that the present performance of the storage system 1 does not satisfy the performance designated by the user. Information on the judgment criteria registered in the management terminal unit 113 in advance (the user request definition table 12 described above) is used for this judgment.

The overall management terminal unit 113, which has judged that the storage system 1 does not satisfy the performance designated by the user, performs predetermined processing, for example, automatically performs redistribution of the resources to the processing. Here, as a method of redistribution of the resources, it is possible that a usage ratio or the like of the resources of each unit is changed so as to comply with the contents of the user request definition table 12. More specifically, the overall management terminal unit 113 instructs each unit to change allocation of processing to the processor units 106 such that the processing performed by the two processor units 106 as described above is performed by the identical processor unit 106. Note that, in performing redistribution of the resources, the overall management terminal unit 113 changes setting information for the storage system managed by the processor units or the like (setting information on utilization of the resources in the storage system; for example, information designating a processor unit that should process specific I/O). In addition, in changing this setting information, the overall management terminal unit 113 may directly instruct a change of setting information for each disk array apparatus or may instruct a change of setting information via the management terminal unit 113 of each disk array apparatus.

On the other hand, in the case in which the user request definition of performance designated by the user is as indicated by (2), on the basis of the state of FIG. 7B, more specifically, a ratio of remote copy processing in each processor unit 106 in the table 51, the overall management terminal unit 113 compares a time ratio of remote copy processing in the processor unit 106 and the user request definition table 12 to judge that a time spared for the remote copy processing is insufficient. The overall management terminal unit 113, which has judged that the storage system does not satisfy the performance requested in (2), performs redistribution of the resources such as allocating the remote copy processing to the processor unit 106 that has a room in a gross utilization ratio (e.g., the processor unit 106 of the processor ID 1).

Figure 12:
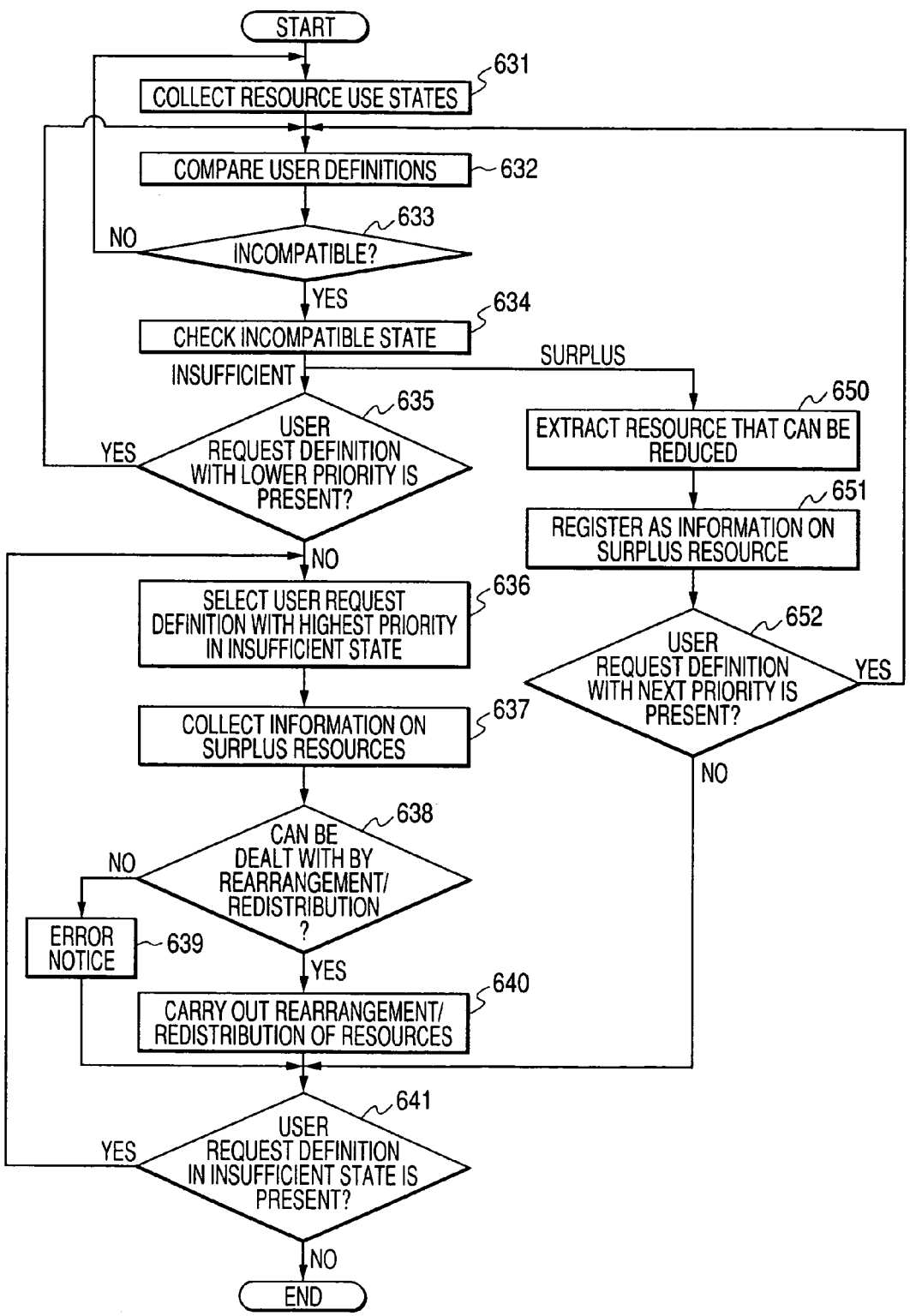
FIG. 12 is a diagram showing an example of procedures of processing for making states of use of resources and required performance compatible with each other.

FIG. 12 is a diagram showing an example of processing procedures from comparison of a state of use of resources and a user definition request and judgment on the state of use of resources to redistribution of the resources in the overall management terminal unit 113.

As described above, the overall management terminal unit 113 compares performance of the storage system 1 and performance requested by the user and judges whether or not the request of the user and the performance of the storage system 1 match. As a result of the judgment, if the storage system 1 does not satisfy the performance requested by the user, the overall management terminal 113 notifies the operator to that effect or automatically performs redistribution of the resources. Note that, in this embodiment, in the case in which there are plural user request definitions, the overall management terminal unit 113 proceeds with processing assuming that priorities are set among the plural user request definitions. However, if priorities are not set, the overall management terminal unit 113 repeatedly performs processing excluding processing on priorities in processing described below without specifically setting orders for all user request definitions. In this processing, the overall management terminal unit 113 performs steps described below in order from a user definition request with a highest priority.

First, at a fixed interval, the overall management terminal unit 113 collects configuration information and the like in the storage system 1 and compares judgment criteria for a user request definition and a state of use of the resources on the basis of a result of the collection to check if the state of use is compatible with conditions of the judgment criteria (steps 631 to 633).

If the state of use of the storage system 1 is not compatible with the judgment criteria for the user request definition, the overall management terminal unit 113 checks whether the incompatible state is a surplus state of the resources or an insufficiency state of the resources, that is, if redistribution is necessary (step 634).

In the case of insufficient resources, the overall management terminal unit 113 confirms presence or absence of a user request definition with a priority lower than that of the user request definition being currently processed. If the user request definition with a lower priority is present, the overall management terminal unit 113 performs processing of step 632 and subsequent steps in order to compare the user request definition and the state of use of the resources. This is because, when the resources are in surplus with respect to the user request definition with a lower priority, the resources are allocated to a user request definition with a higher priority. In this case, the overall management terminal unit 113 records information on user request definitions with insufficient resources together with priorities thereof (step 635).

If the user request definition with a priority lower than that of the user request definition being processed currently is not present, the overall management terminal unit 113 selects a user request definition with a highest priority among the user request definitions recorded in step 635. Note that the overall management terminal unit 113 deletes information on the selected user request definition from the record (step 636). Thereafter, the overall management terminal unit 113 confirms presence or absence of surplus resources concerning resources insufficient in the selected user request definition. More specifically, the overall management terminal unit 113 confirms presence or absence of re-distributable resources on the basis of the information on surplus resources shown in FIG. 9 (step 637).

If there are re-distributable resources, the overall management terminal unit 113 redistributes the resources. More specifically, the overall management terminal unit 113 instructs each processor unit 106 to be an object of redistribution to reject acceptance of processing of the task for a fixed time or instructs a job queue of the task to cut down jobs such that a processing ratio of the processing changes appropriately in a fixed time (step 640).

On the other hand, if there is no re-distributable resources, the overall management terminal unit 113 informs the operator or the like, via the management apparatus 116, that the performance requested by the user cannot be satisfied (step 639).

On the other hand, if the resources are in surplus with respect to the user request definition defined by the user in step 634, the overall management terminal unit 113 specifies a resource in surplus on the basis of the table 51 of FIG. 7B (step 650). Next, the overall management terminal unit 113 registers (updates) information on the resource in surplus in the table 55 (step 651). Next, the overall management terminal unit 113 confirms presence or absence of a user request definition of a priority next to that of the user request definition being processed currently. If there is the user request definition of the next priority is present, the overall management terminal unit 113 repeats the processing of step 633 and subsequent steps (step 652).

After performing error notice in step 639, after performing redistribution of resources in step 640, or if there is no user request definition of the next priority in step 652, the overall management terminal unit 113 confirms if the user request definitions recorded in step 635 are left (step 641). If it is confirmed in step 641 that the user request definitions are still recorded, the overall management terminal unit 113 repeats the processing of step 636 and subsequent steps. On the other hand, if the user request definitions are not recorded, the overall management terminal unit 113 ends the processing.

In the above-mentioned embodiment, in some cases, performance requested by the user cannot be realized even if the overall management terminal unit 113 performs rearrangement of resources being used in the storage system. For example, there is a case in which, when all utilization ratios of the interface units to be connected to the host computers or utilization ratios of the processor units are 80% or more, in order to increase performance requested by the user, for example, a throughput to a requested value, there is no way but to add a new resource. Basically, this can be dealt with by redistribution of the resources in the storage system 1 only in the case in which degrees of use are imbalanced among the resources. In the case in which utilization ratios of all the resources are high, there is no way but to deal with it by adding a resource.

In the case in which the performance requested by the user cannot be realized by rearrangement of the resources in the storage system 1, the user is required to add a new resource to the storage system 1. In such a case, in general, a possible procedure is that, after a notice pointing out that the performance of the storage system 1 does not satisfy the request is sent to a manufacturer or the like form the user, a maintenance man visits the user to perform addition of resources or the like. However, this takes time until the problem is solved in the storage system 1.

Thus, as a second embodiment, an example will be considered in which the overall management terminal unit 113 or the management apparatus 116 pools and manages auxiliary resources that are mounted on the storage system 1 in advance but are not incorporated in operation of the storage system 1. Then, in the case in which the storage system 1 cannot satisfy a performance requested by a user, the overall management terminal unit 113 or the like selects necessary resources from the resource pool and allocates the resources. In the case in which a performance of the storage system 1 has become excessive with respect to the performance requested by the user, the overall management terminal unit 113 or the like performs redistribution of the resources and returns remaining resources to the resource pool.

In this way, in the storage system 1, the resources included in the resource pool can be added as resources executing processing by a necessary time whenever necessary (in a case such as a case of unsteady load that occurs suddenly in a short time), and when resources has become unnecessary, the resources can be returned to the resource pool.

Figure 13:
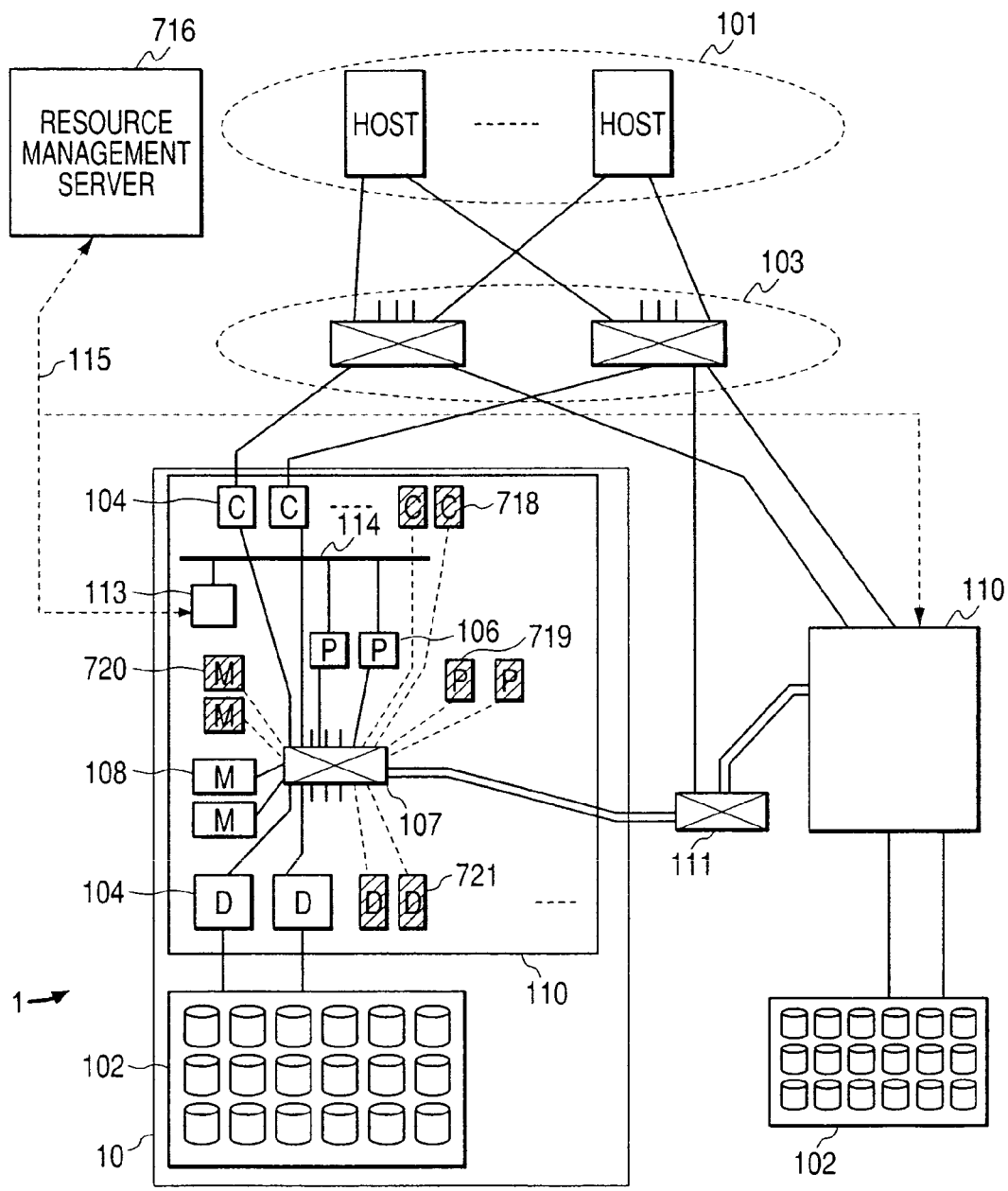
FIG. 13 is a diagram showing an example of a structure of a storage system that increases or reduces resources using a resource pool.

FIG. 13 is a diagram showing an example of a structure of the storage system 1 that uses a resource pool to satisfy performance requested by a user. The storage system 1 of this embodiment basically has the same structure as the first embodiment. However, the storage system 1 includes resources that are not usually used (processor units 719, interface units 718, and memory units 720; hereinafter also referred to as "auxiliary resources").

In addition, the management apparatus 116 described in the first embodiment manages the auxiliary resources of the storage system 1 as a resource pool. Thus, in this embodiment, the management apparatus 116 is referred to as a resource management server 716. The resource management server 716 collects information on resources included in the respective disk array apparatuses 10 from the storage system 1. In addition, the respective disk array apparatuses 10 manage information on auxiliary resources included therein.

FIG. 14 is a diagram showing an example of a table 1500 that is used by the resource management server 716 in order to manage the resources included in the storage system 1 as a resource pool. The table 1500 includes records for the number of slots for mounting the resources included in the storage system 1. Each record includes: a field 1501 in which an identifier allocated to a customer who is a user of each disk array apparatus 10 (customer ID) is registered; a field 1502 in which an identifier allocated to the disk array apparatus 10 assigned to the customer (disk array ID) is registered; a field 1503 in which an identifier representing a slot to which each resource is mounted (slot ID) is registered; a field 1504 in which information on whether a resource is amounted to a corresponding slot is registered; a field 1505 in which information on an ID allocated to an implemented resource is registered; a field 1506 in which information on whether a fixed (permanent) key is issued to a corresponding resource is registered; a field 1507 in which information on the issued key corresponding to the resource is registered; and a field 1508 in which information on a state (normal or failure) of the implemented resource is registered. With this table, the resource management server 716 can manage whether a resource included in the storage system 1 is a resource that is used steadily or an auxiliary resource. More specifically, the resource management server 716 issues a permanent or temporary key to the storage system 1 to thereby designate a type of a resource (a resource in use or an auxiliary resource).

FIG. 15 is a diagram showing an example of a table 1510 that is used by the resource management server 716 in order to mange a key issued to the storage system 1. The resource management server 716 uses this table to manage issue timing, a gross issue time, and the like of the key, and then the resource management server 716 uses the issue timing, the gross issue time, and the like in creation and the like of information on charging to a customer. The table 1510 includes a record for each resource to which a key is issued. Each record includes: a field 1511 in which a disk array ID of the disk array apparatus 10, to which a resource corresponding to the record belongs, is registered; a field 1512 in which a slot ID of a slot, to which the resource corresponding to the record is mounted, is registered; a field 1513 in which an ID of the resource corresponding to the record is registered; a field 1514 in which a time, when a key corresponding to the resource corresponding to the record was issued, is registered; a field 1515 in which a time, when the key corresponding to the resource corresponding to the record was invalidated, is registered; a field 1516 in which information on a gross time, during which the key corresponding to the resource corresponding to the record was valid, is registered; and a field 1517 in which information on a gross time of the month, during which the key corresponding to the resource corresponding to the record was valid, is registered.

The resource management server 716 uses the above-mentioned management table to manage when a key was issued to which resource in which slot in which disk array apparatus and when the key was invalidated, and manages a gross time during which the key was valid and a time during which the key was valid in a fixed period (here, for example, a month). Consequently, the resource management server 716 performs management of the key and uses this information in charging information (charging corresponding to a use time of the key) and the like. Note that these management tables are updated according to information from each disk array apparatus.

The resource pool is set as described below.

First, the resource management server 716 collects information on resources (at this point, it is not decided which resources become auxiliary resources), which are included in the storage system 1, from the storage system 1. Thereafter, the resource management server 716 determines resources and auxiliary resources, which can be used in the storage system 1, on the basis of the collected information on the resources. It is determined arbitrarily by a manufacturer providing the storage system 1 or an administrator which resources are set as auxiliary resources. The resource management server 716 registers the determined information in the table 1500.

Thereafter, the resource management server 716 informs the storage system 1 of resources that can be used in the storage system 1 (hereinafter also referred to as "resources for use"). More specifically, the resource management server 716 informs the storage system 1 of an available key corresponding to the resources for use. The storage system 1 cannot use the resources included therein unless the available key is registered. As a method of registering the available key in the storage system 1, for example, the available key may be inputted by a maintenance man manually from the management terminal unit 113 of the disk array apparatus 10 at the time of initial installation. Alternatively, after receiving issuance of the available key through communication with the resource management server 716, the management terminal unit 113 may automatically register the received issued available key. When the key is notified to the storage system 1, the resource management server 716 updates the contents of the tables 1500 and 1510.

The management terminal unit 113 of the disk array apparatus detects resources included in the management terminal unit 113 in an initial sequence after a power supply is turned on, and manages whether or not the issued available key is registered for the detected resources according to information on a management database included therein. The resource management server 716 manages two pieces of information on states of resources of each disk array apparatus 10 and the key issued and managed by the resource management server 716 as resource management information (table 1500) through communication with the management terminal 113 of the disk array apparatus 10. Therefore, a set of resources, to which the available key has not been issued, among all the resources included in the storage system 1 becomes a resource pool. The resource management server 716 uses the resource management information (table 1500) to manage the resource pool.

If a request for acquisition of a resource included in the resource pool is received from the overall management terminal unit 113 of the disk array apparatus 10, the resource management server 716 instructs the storage system 1 to add the resource. More specifically, the resource management server 716 sends an available key for the resource to the storage system 1. In addition, the resource management server 716, which has been informed of the end of use of the added resource by the storage system 1, returns the resource to the resource pool. More specifically, the resource management server 716 instructs the storage system 1 to delete an available key corresponding to the resource to be returned to the resource pool.

Moreover, the resource management server 716 accumulates a use history such as a time, during which the storage system 1 used the added resource, and uses the use history in information for charging the user for the use of the resource.

Figure 16:
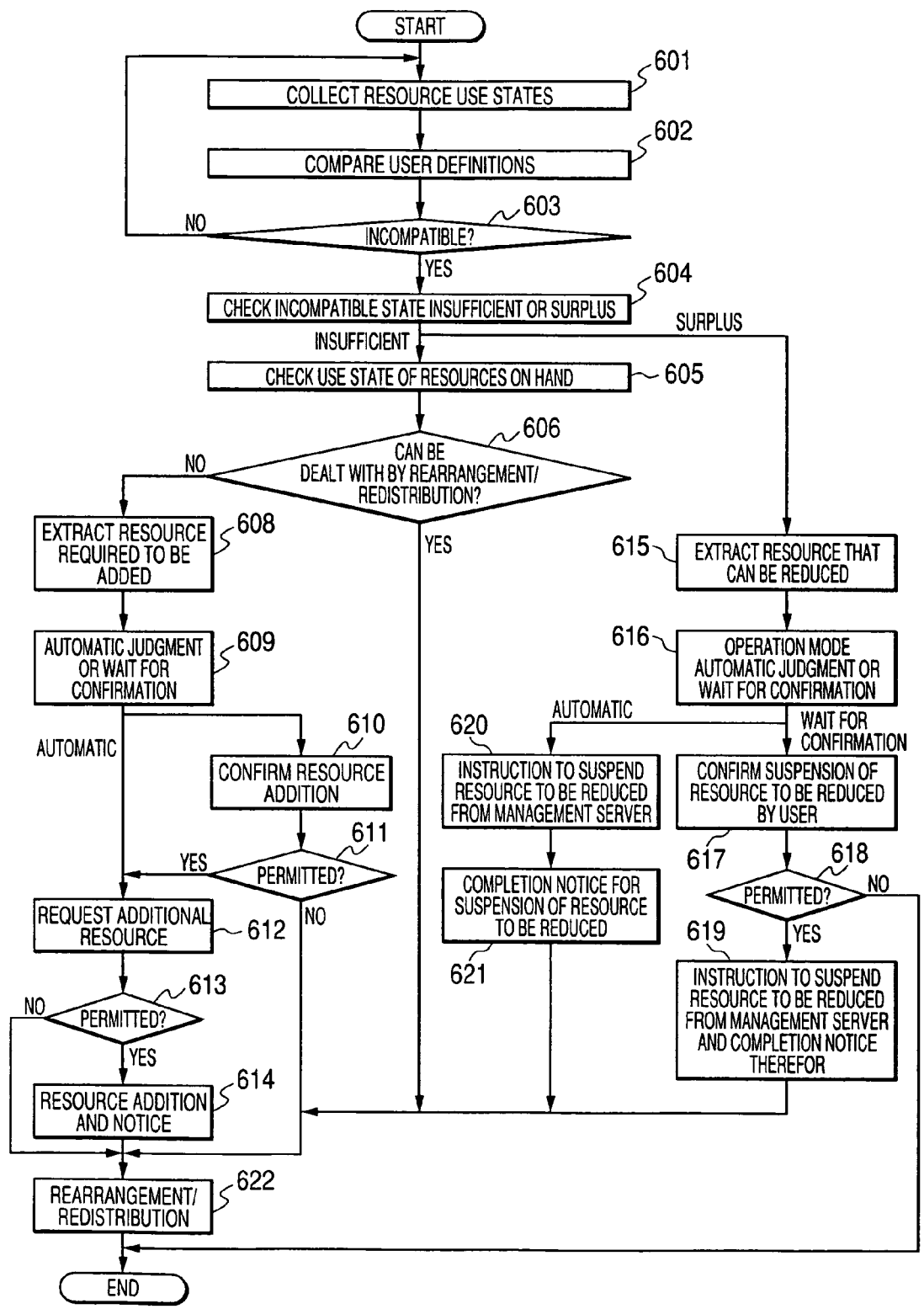
FIG. 16 is a diagram showing an example of procedures of processing for making states of use of resources and required performance of user definition compatible with each other.

FIG. 16 is a diagram showing an example of processing procedures from comparison of a state of use of resources and a user definition request and judgment on the state of use of resources to redistribution of the resources in the overall management terminal unit 113 in the second embodiment. Note that, in this embodiment, it is assumed that request definitions by plural users are not made.

As described above, the overall management terminal unit 113 compares performance of the storage system 1 and performance requested by the user and judges whether or not the request of the user and the performance of the storage system 1 agree with each other. As a result of the judgment, if the storage system 1 does not satisfy the performance requested by the user, the overall management terminal 113 notifies the operator to that effect or automatically performs redistribution of the resources. Note that, in this embodiment, in the case in which there are plural user request definitions, the overall management terminal unit 113 applies the processing shown in FIG. 16 to all the user request definitions regardless of presence or absence of priorities. Alternatively, the overall management terminal unit 113 may perform the processing in an order of priorities.

First, at a fixed interval, the overall management terminal unit 113 compares judgment criteria for a user request definition and a state of use of the resources to check if the state of use is compatible with conditions of the judgment criteria (steps 601 to 603). If the state of use of the storage system 1 is not compatible with the judgment criteria for the user request definition, the overall management terminal unit 113 checks whether the incompatible state is a surplus state of the resources or an insufficiency state of the resources, that is, if redistribution is necessary (step 604).

If the incompatible state is insufficiency of resources, the overall management terminal unit 113 confirms a state of use of the resources that are being used by the storage system 1 (step 605). Thereafter, the overall management terminal unit 113 judges whether or not the insufficiency of resources can be dealt with by redistribution of the resources (step 606). If it is judged that the insufficiency of resources cannot be dealt with by the redistribution of the resources, the overall management terminal unit 113 determines which resource (a processor unit, an interface unit, etc.) is required to be added (step 608). Thereafter, the storage system 1 judges whether or not the addition of the determined resource is automatically performed or requires permission of the user (step 609).

If the addition of the resource is performed on the basis of permission of the user in the storage system 1, the overall management terminal unit 113 of the storage system 1 outputs display for inquiring propriety of the addition of the resource to an output section or the like included in the management terminal unit 113 (steps 610 and 611).

If the addition of the resource is performed automatically in the storage system 1, or if the permission of the user is obtained in step 611, the overall management terminal unit 113 of the storage system 1 requests the resource management server 716 to add the resource determined in step 608 (step 612).

If the permission for the addition of the resource is obtained from the resource management server 716 (receipt of an available key), the overall management terminal unit 113 of the storage system 1 performs rearrangement of the resources using the resource permitted to be added (steps 613, 614, and 622). If the addition of the resource is not permitted in step 611 or 613, the overall management terminal unit 113 of the storage system 1 ends the processing without doing anything.

On the other hand, if the surplus state is detected in step 604, the overall management terminal unit 113 of the storage system 1 determines a resource to be deleted (step 615). Thereafter, the overall management terminal unit 113 judges whether deletion of the determined resource is automatically performed or requires permission of the user (step 616).

If the deletion of the resource is performed on the basis of permission of the user in the storage system 1, the overall management terminal unit 113 outputs display for inquiring propriety of the deletion of the resource to the output section or the like included in the management terminal unit 113. Note that, instead of the display, mail transmission to an administrator or the like may be used (steps 617 and 618).

If the deletion of the resource is automatically performed in the storage system 1 or the permission of the user is obtained in step 618, the overall management terminal unit 113 deletes the resource determined in step 608.

More specifically, the overall management terminal unit 113 brings the resource to be deleted into a suspension state and informs the resource management server 716 of the resource brought into the suspension state. The resource management server 716 having been informed of the resource deletes information of a key concerning the informed resource registered in the table 1500 (i.e., returns the informed resource to the resource pool). Then, the resource management server 716 instructs the overall management terminal unit 113 to delete the information of the key concerning the informed resource. The overall management terminal unit 113, which has received the instruction to delete the key, deletes the information of the key and sends a notice of completion of the deletion (hereinafter referred to as "completion notice for resource deletion") to the resource management server 716 (steps 619, 620, and 621). Thereafter, the overall management terminal unit 113 rearranges the remaining resources (step 622).

Note that, the overall management terminal unit 113 may switch and use a mode for performing addition or deletion of a resource according to automatic judgment without intervention of the operator as shown in steps 616 to 621 and steps 608 to 612 and a mode for executing the addition or the deletion waiting for confirmation of the operator as shown in steps 615 to 619 and steps 609 to 611, or may use only one of the modes.

Figure 17:
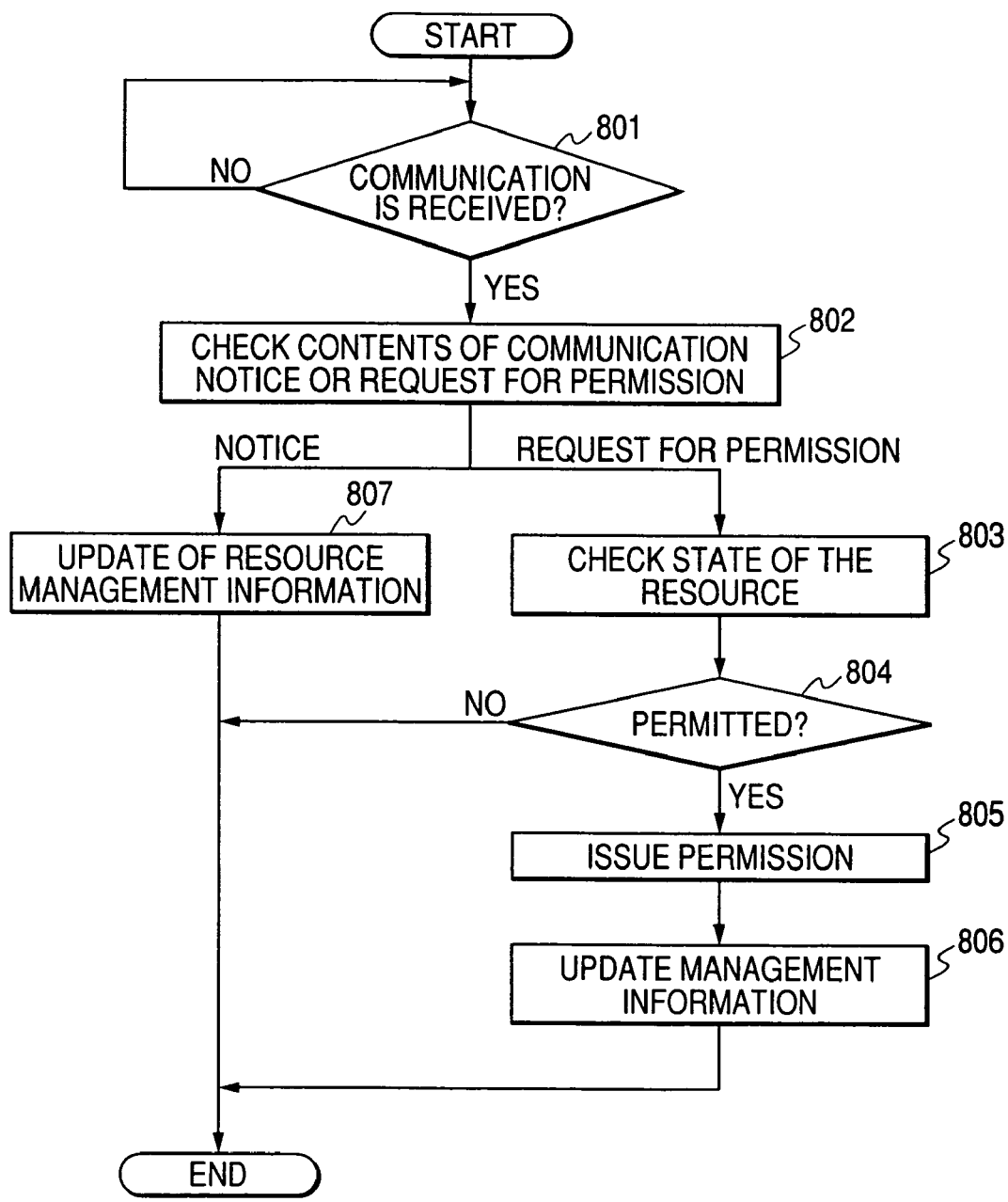
FIG. 17 is a diagram showing an example of procedures of processing for permission of use of resources and processing for information management in a resource management server.

FIG. 17 is a diagram showing an example of procedures of control to be executed in the resource management server 716 that has received a request for addition of a resource or a notice of deletion of a resource. The resource management server 716 performs update of management information (a log of time when use of a resource is suspended and time when user of the resource is started, etc.) or control for permission or non-permission of use of a resource according to a state of a requested resource on the basis of contents of communication with the overall management terminal unit 113.

The resource management server 716 periodically or always monitors if communication is sent from the overall management terminal unit 113 (step 801). If communication is received from the overall management terminal unit 113, the resource management server 716 judges whether contents of the communication are a request for addition of a resource or a notice of a suspended resource (step 802). If the contents of the communication are the notice of suspension of a resource, the resource management server 716 updates the resource management information (table 1500, etc.) in order to return the deleted resource to the resource pool. Thereafter, the resource management server 716 informs the overall management terminal unit 113 of deletion of a key concerning the suspended resource (step 807).

On the other hand, if the contents of the communication are a request for addition of a resource, the resource management server 716 checks a state of the requested resource (availability of the requested resource, presence or absence of operation failure, etc.) and judges propriety of the addition of the resource (steps 803 and 804). If the addition of the resource is permitted, the resource management server 716 permits the overall management terminal unit 113, which has sent the request, to add the resource. More specifically, the resource management server 716 sends an available key, which corresponds to the resource permitted to be added, to the overall management terminal unit 113 (step 805). Thereafter, the resource management server 716 updates the resource management information (step 806).

On the other hand, if the addition of the resource is not permitted, the resource management server 716 informs the overall management terminal unit 113 of rejection of the addition of the resource and ends the processing. Note that the update of the resource management information may be performed at timing when a completion notice for deletion of the resource is received rather than at the time when suspension of the resource is informed. In this case, the resource management server 716, which has received the notice of suspension of the resource, informs the overall management terminal unit 113 of the deletion of the key without updating the table 1500 and updates the table 1500 in response to receipt of the completion notice for deletion of the resource from the overall management terminal unit 113.

Note that a constitution described below is also possible as another embodiment. That is, the overall management terminal unit 113 is not decided, and the management terminal unit 113 of each disk array 10 directly sends collected information to the management apparatus 116 via the network 115.

In this case, the management apparatus 116 is not a simple input/output terminal but performs collection and arrangement of configuration information and the like of the storage system 1 (maintenance of the tables shown in FIGS. 7 to 9, etc.). In other words, the management apparatus 116 performs the processing performed by the overall management terminal unit 113. Therefore, the management apparatus 116 also performs comparison of the collected configuration information and the like and a performance request of a user and judgment on the comparison. Then, as a result of the judgment, if it is necessary to automatically perform rearrangement of resources, the management apparatus 116 sends information on the rearrangement of the resources to the respective management terminal units 113 of the storage system 1. The respective management terminal units 113, which have received the information on the rearrangement of the resources, change distribution of resources included in the management terminal units 113 on the basis of the information.

With such an embodiment, load on the management terminal units 113 does not increase.

According to the present invention, a storage system having more flexible scalability can be provided. In addition, performance of the storage system can be adjusted so as to be performance requested by a user.

What is claimed is:

1. A storage system to couple to one or more computers comprising:
multiple disk array apparatuses, wherein each of the disk array apparatuses comprises a control unit and plural disk devices,
wherein each said control unit comprises:
plural channel interface units able to couple to said one or more computers and able to transfer data between said one or more computers and said control unit;
plural disk interface units able to couple to said disk devices and able to transfer data between said disk devices and said control unit;
at least one processor unit independently allocatable to said channel interface units and said disk interface units for controlling transfer of data between said one or more computers and said channel interface units, and between said disk devices and said disk interface units;
a memory unit in which data to be written to said plural disk devices or data to be read out from said plural disk devices is stored;
an interconnection that connects said channel interface units, said disk interface units, said at least one processor unit, and said memory unit to one another; and
a management terminal unit connected to said at least one processor unit,
wherein said at least one processor unit is allocated to a plurality of tasks for data transfer by using the channel interface units, the disk interface units, the memory unit, and the interconnection;
wherein a first one of said management terminal units receives a first information that includes a use condition of said at least one processor unit, said channel interface units, and said disk interface units for each of said disk array apparatuses, and
wherein said first management terminal unit compares said first information and a second information that represents a performance request to be inputted from said computer, and changes an allocation of resources in said storage system, in response to a result of said comparison,
wherein said allocation of resources includes, for each disk array apparatus, an allocation of the at least one processor unit for the plurality of tasks, an allocation of said channel interface units, and an allocation of said disk interface units as resources allocable independently of each other.

2. A storage system according to claim 1, wherein said first management terminal unit changes a task allocation of one or more said at least one processor units if said first information is not satisfied with a performance request of said second information.

3. A storage system according to claim 1, wherein there are two said processor units in at least one of said control units, and said first information includes an operating ratio of said two processor units in said at least one control unit, and
wherein said allocation of resources includes reallocation of tasks between said processor units in said at least one control unit.

4. A storage system according to claim 1, wherein said first information further includes a utilization ratio of said memory unit in at least one of said control units, wherein an allocation of said memory unit is included in said allocation of resources.

5. A storage system according to claim 1, wherein said first information further includes a utilization ratio of a path for connecting said interconnection and said at least one processor, said channel interface units, said disk interface units and/or said memory in one or more of said disk array apparatuses.

6. A storage system according to claim 1, wherein said first information includes a utilization ratio of a port of one of said channel interface units in one or more of said disk array apparatuses.

7. A storage system according to claim 1, wherein said first information includes a utilization ratio of one or more of said at least one processor units which is assigned to execution of remote copy.

8. A storage system according to claim 1, wherein said first information includes a utilization ratio of one or more of said at least one processor units which is assigned to execution of mirroring.

9. A storage system according to claim 1, wherein said first information includes a utilization condition of surplus processing capacity in one or more of said at least one processor units.

10. A storage system to couple to one or more computers comprising:
plural disk array apparatuses,
wherein each of the plural disk array apparatuses comprises a control unit and plural disk devices,
wherein each said control unit comprises:
plural interface units to couple to said one or more computers or said plural disk devices for transferring data between said computers or said disk devices and said control unit;
a memory unit in which data to be written to said plural disk devices or data to be read out from said plural disk devices is stored;
at least one processor unit independently allocable for controlling transfer of data between said one or more computers, said disk devices, said interface units and said memory unit;
an interconnection that connects said interface units, said at least one processor unit, and said memory unit to one another; and a management terminal unit connected to said at least one processor unit, wherein a first said management terminal unit included in said storage system collects a first information that includes task allocations of said at least one processor units, and allocations of said interface units in said plural disk array apparatuses in said storage system, compares said first information with a second information, to be inputted from an external device, that includes a performance request, and changes the task allocation among the at least one processor units and the interface units in at least one of said disk array apparatuses of said storage system in response to a result of said comparison.

11. A storage system according to claim 10, wherein said first management terminal unit reallocates tasks among a first said at least one processor unit on a first disk array apparatus and a second said at least one processor unit on said first disk array apparatus if said first information is not satisfied with the performance request of said second information.

12. A storage system according to claim 11, wherein said first information represents a utilization condition of said first and second processor units under said task allocation, and said second information represents a response time for accessing a logical volume.

13. A storage system according to claim 10, wherein said first management terminal unit has a third information on usable resources in said storage system, said third information corresponding to surplus processing capacity available among said at least one processor unit on each disk array apparatus.

14. A storage system according to claim 13, wherein when said first management terminal unit compares said first information and said second information, if it is judged that resources for meeting the performance request of said second information are insufficient, said first management terminal unit reallocates tasks among said at least one processor unit on at least one of said disk array apparatuses based upon said third information, and updates contents of said third information.

15. A storage system according to claim 13, wherein when said first management terminal unit compares said first information and said second information, and if it is judged that resources for meeting the performance request of said second information are in surplus, said first management terminal unit reallocates tasks among said at least one processor unit on at least one of said disk array apparatuses so as not to use the surplus resources, based upon said third information, and updates contents of said third information.

16. A storage system according to claim 10, wherein plural said second information are inputted, and said first management terminal unit stores said plural second informations together with an information on predetermined priorities.

17. A storage system according to claim 16, wherein said first management terminal unit allocates resources in surplus to said second information, with a high priority given to resources that are insufficient.

18. A storage system to couple to one or more computers comprising:

plural disk array apparatuses, wherein each of the plural disk array apparatuses comprises a control unit and plural disk devices, wherein each said control unit comprises:

plural interface units connected to said one or more computers or said plural disk devices;

a memory unit in which data to be written to said plural disk devices or data to be read out from said plural disk devices is stored;

plural processor units independently allocable among said interface units for controlling transfer of data between said one or more computers, said disk devices, and said memory unit;

a management terminal unit connected to said processor units; and an interconnection that connects said interface units, said processor units, and said memory unit to one another;

wherein said plural processor units and said plural interface units in each said disk array apparatus comprise resources independently allocable in the storage system;

wherein a management apparatus in said storage system collects a first information that represents a condition of said resources in said storage system, and compares said first information and a second information that represents a performance request to be inputted from one of said one or more computers, and allocates said resources included in said control units of said disk array apparatuses, including allocating processing tasks among said processor units and allocating said interface units in response to a result of said comparison.

19. A storage system according to claim 18, wherein said management apparatus allocates processing tasks between a first processor unit in a first one of said control units and a second processor unit in said first control unit if said first information is not satisfied with the performance request of said second information.

20. A storage system according to claim 18, wherein allocating processing tasks includes a redistribution of an operating ratio of at least one of said processor units in one or more of said control units.

21. A storage system according to claim 18, wherein allocating the resources included in said control units includes a redistribution of a utilization ratio of said memory unit.

22. A storage system according to claim 18, wherein allocating the resources included in said control units includes a redistribution of a utilization ratio of a path for connecting said interconnection and said resources.

23. A storage system according to claim 18, wherein allocating the resources included in said control units is based on a utilization ratio of a port of one or more of said interface units.

24. A storage system according to claim 18, wherein allocating the resources included in said control units includes adding or deleting one of said processor units from at least one of said control units.

25. A storage system according to claim 18, wherein allocating the resources included in said control units includes adding or deleting said memory unit.

26. A computer system comprising:

one or more computers; and a storage system to couple to said one or more computers;

wherein said storage system comprises multiple disk array apparatuses, wherein each of the disk array apparatuses comprises a control unit and plural disk devices, wherein each said control unit comprises:

one or more first interface units to couple to said one or more computers and plural second interface units to couple to said plural disk devices;
a memory unit in which data to be written to said plural disk devices or data to be read out a from said plural disk devices is stored;
one or more processor units, wherein a processing capacity of each said processor unit is able to be allocated to a plurality of tasks for controlling transfer of data between said one or more computers, said first and second interface units, said memory, and said disk devices;
an interconnection that connects said first and second interface units, said one or more processor units, and said memory unit to one another; and
a management terminal unit connected to said one or more processor units,
wherein a first said management terminal unit in a first said disk array apparatus:
collects a first information that represents a condition of resources included in each said control unit, said condition of resources including a utilization of said first and second interface units, a utilization of said memory, a utilization of said interconnection, and a utilization of said one or more processor units in each disk array apparatuses,
compares said first information and a second information that represents a performance request to be inputted from said one or more computers, and
changes an allocation of at least one of said condition of resources in said disk array apparatuses in response to a result of said comparison.

27. A computer system according to claim 26, wherein said first management terminal unit changes a task allocation of said one or more processor units if said first information is not satisfied with the performance request of said second information, such that said one or more processor units change a utilization ratio for one or more specified tasks of said plurality of tasks.

28. A computer system according to claim 26, wherein said first information includes an operating ratio of said one or more processor units in one or more of said control units.

29. A computer system according to claim 26, wherein said first information includes a utilization ratio of said memory unit in one or more of said control units.

30. A computer system according to claim 26, wherein said first information includes a utilization ratio of a path for connecting said interconnection and said resources in one or more of said control units.

31. A computer system according to claim 26, wherein said first information includes a utilization ratio of a port of one of said interface units in one or more of said control units.

32. A computer system according to claim 26, wherein there are two said processor units in one of said control units and a task is reallocated from one of said processor units to the other of said processor units.

33. A computer system according to claim 26, wherein said first information includes a utilization ratio of said one or more processor units assigned to execution of mirroring.

34. A computer system according to claim 26, wherein said first information includes a utilization condition of surplus processing capacity of one or more of said one or more processor units, whereby said first management terminal unit is able to allocate said surplus processing capacity in response to said comparison.

35. A computer system coupled to a storage system, comprising:
one or more computers; and
a storage system connected to said one or more computers;
wherein said storage system comprises plural disk array apparatuses,
wherein each of the plural disk array apparatuses comprises a control unit and plural disk devices,
wherein each said control unit comprises:
a plurality of first interface units to couple to said one or more computers;
a plurality of second interface units to couple to said plural disk devices;
a memory unit in which data to be written to said plural disk devices or data to be read out from said plural disk devices is stored;
an interconnection that connects said first interface units, said second interface units and said memory unit to one another; and
a processor unit connected to said interconnection, wherein a processing capacity of said processor unit is able to be allocated to a plurality of tasks for controlling transfer of data between said one or more computers, said first and second interface units, said memory, and said disk devices; and
a management terminal unit connected to said processor units,
wherein said processing capacity of said processor unit and said first and second interface units of said disk array apparatuses comprise resources allocable independently in said storage system;
wherein a first said management terminal unit included in a first one of said disk array apparatuses collects a first information that represents a condition of the resources in said storage system, and
compares said first information and a second information, to be inputted from an external device, that represents a standard of judgment of whether the resources in said storage system are used or not, and
changes an allocation of said resources of said storage system in response to a result of said comparison, said change in allocation including a change in allocation of tasks for said processor units and a change in allocation of said first and second interface units in said plural disk array apparatuses.

36. A computer system according to claim 35, wherein said first management terminal unit changes the allocation of tasks for said processor units and allocation of said first and second interface units if said first information is not satisfied with a performance request of said second information.

37. A computer system according to claim 36, wherein said first information represents a utilization condition of one or more of said processor units, and said second information represents a response time of one of said processor units to said external device.

38. A computer system according to claim 35, wherein said first management terminal unit has a third information on usable surplus of said resources in said storage system.

39. A computer system according to claim 38, wherein when said first management terminal unit compares said first information and said second information, and
if it is judged that the resources for attaining the standard of judgment of said second information are insufficient, said first management terminal unit reallocates the resources, including the surplus resources, based on said third information, and updates contents of said third information.

40. A computer system according to claim 38, wherein when said first management terminal unit compares said first information and said second information, and
if it is judged that the resources for attaining the standard of judgment of said second information are in surplus, said first management terminal unit changes the setting of said storage system so as not to use the surplus resources, based upon said third information, and updates contents of said third information.

41. A computer system according to claim 38, wherein plural said second information are inputted, and said first management terminal unit stores said plural second informations together with information on predetermined priorities.

42. A computer system according to claim 41, wherein said first management terminal unit allocates the resources in surplus to said second information, with a high priority given to the resources that are insufficient.

43. A computer system according to claim 35, wherein said computer system further comprises a management device connected to said first management terminal unit,
wherein said management device holds a third information on presence or absence of use of the resources in said storage system,
wherein said first management terminal unit requests said management device to add one or more additional said resources if said first management terminal unit judges that one or more additional said resources are required to attain the standard of judgment of said second information when comparing said first information and said second information,
wherein said management device sends information permitting use of the one or more additional said resources to said first management terminal unit on the basis of said third information.

44. A computer system according to claim 35, wherein said computer system further comprises a management device connected to said first management terminal unit,
wherein said management device holds a third information on presence or absence of use of the resources in said storage system,
wherein said first management terminal unit requests said management device to delete one or more of said resources if said first management terminal unit judges that there is a surplus of said resources to attain the standard of judgment of said second information when comparing said first information and said second information,
wherein said management device sends information permitting deletion of the one or more resources to said first management terminal unit on the basis of said third information.

45. A computer system comprising:
one or more computers; and
a storage system connected to said one or more computers,
wherein said storage system comprises plural disk array apparatuses,
wherein each of the plural disk array apparatuses comprises a control unit and plural disk devices,
wherein each said control unit comprises:
plural interface units to couple to said one or more computers or said plural disk devices;
a memory unit in which data to be written to said plural disk devices or data to be read out from said plural disk devices is stored;
at least one processor unit having a processing capacity that is independently allocable to a plurality of tasks for controlling transfer of data between said one or more computers and said memory unit via said interface units and/or between said disk devices and said memory unit via said interface units; and
an interconnection that connects said interface units, said at least one processor unit, and said memory unit to one another;
wherein said at least one processor unit and said interface units comprise resources allocable independently in each said disk array apparatus
wherein a first management terminal unit included in said storage system collects a first information that represents a condition of said resources in said disk array apparatuses in said storage system, and
compares said first information and a second information that represents a performance request to be inputted from said one or more computers, and
allocates the resources included in said disk array apparatuses in response to a result of said comparison, said allocation of the resources including allocating said tasks among said at least one processor units and allocating the interface units in at least one of said disk array apparatuses.

46. A computer system according to claim 45, wherein said first management terminal unit allocates resources in a first control unit including allocating said tasks among a first processor unit of said at least one processor units in a first said control unit and a second processor unit of said at least one processor units in said first control unit if said first information is not satisfied with the performance request of said second information, wherein said first management terminal unit is in a disk array system separate from said first control unit.

47. A computer system according to claim 46, wherein allocating resources included in said first control unit includes a redistribution of an operating ratio of said first processor unit and said second processor unit.

48. A computer system according to claim 46, wherein allocating the resources in said disk array apparatuses includes a redistribution of a utilization ratio of said memory unit in at least one of said disk array apparatuses.

49. A computer system according to claim 45, wherein allocating the resources in said disk array apparatuses includes a redistribution of a utilization ratio of a path for connecting said interconnection and said resources in at least one of said disk array apparatuses.

50. A computer system according to claim 45, wherein allocating the resources included in said disk array apparatuses is based upon a utilization ratio of a port of one of said interface units in at least one of said disk array apparatuses.

51. A computer system according to claim 45, wherein allocating the resources included in said disk array apparatuses includes adding or deleting one of said at least one processor units in at least one of said disk array apparatuses.

52. A computer system according to claim 45, wherein allocating the resources included in said disk array apparatuses includes adding another said memory unit in at least one of said disk array apparatuses.

* * * * *